Jan. 2, 1951  G. C. WITHEY ET AL  2,536,338
FOLDING GOOSE-DUCK DECOY
Filed Jan. 17, 1947
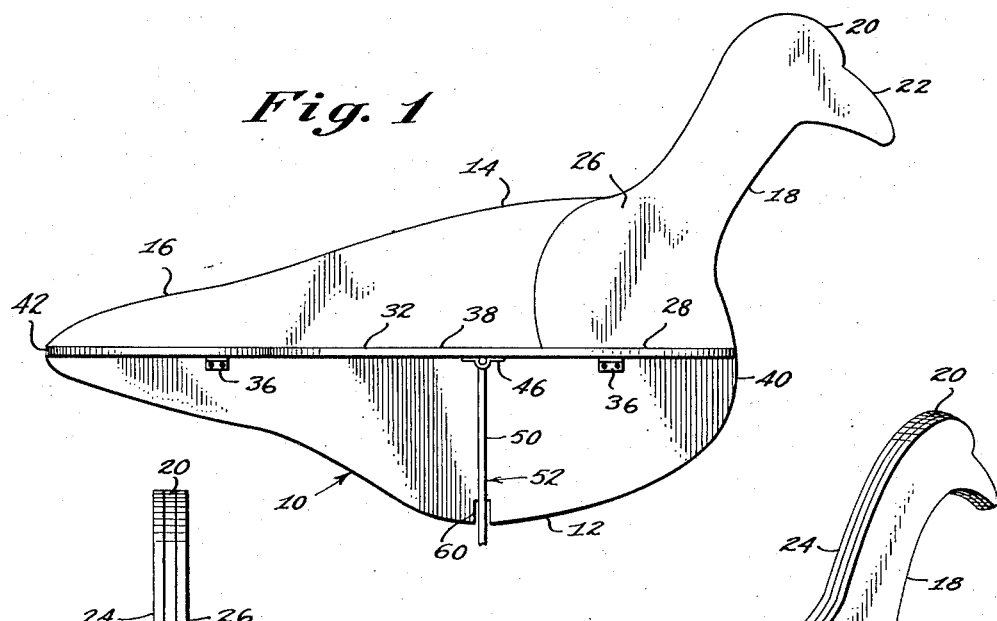
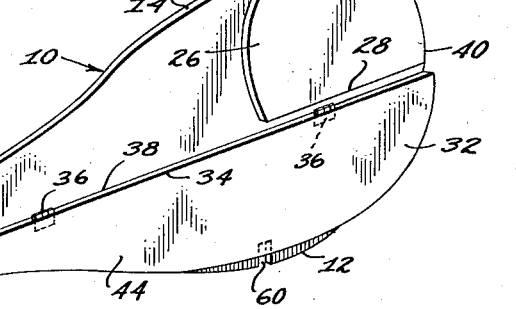
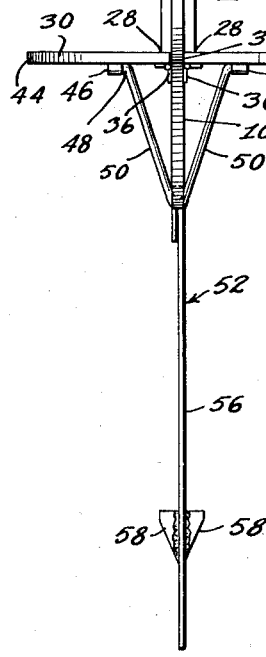
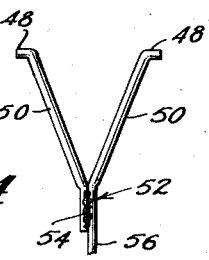
Inventors
GEORGE C. WITHEY AND
ROBERT E. WITHEY Patented Jan. 2, 1951

2,536,338

UNITED STATES PATENT OFFICE 2,536,338

FOLDING GOOSE-DUCK DECOY

George C. Withey, Willow City, and
Robert E. Withey, Minot, N. Dak.

Application January 17, 1947, Serial No. 722,524

1 Claim. (Cl. 43—3)

This invention relates to decoys.

An object of the invention is to provide a decoy for ducks, geese and the like, which is so constructed as to be foldable into a small space when not in use.

Another object of the invention is to provide a folding goose-duck decoy which can be plainly seen from any angle and especially from the sky.

A further object of the invention is to provide a decoy which is very light in weight and can be made of easily available and inexpensive materials, the decoy being quite effective for the purpose for which it is to be used.

Other objects and advantages of the invention will become apparent from the following description of a preferred embodiment thereof as illustrated in the accompanying drawings, and in which:

Figure 1 is a side elevation of the decoy in unfolded position, ready for use.

Figure 2 is a left end elevation of the decoy shown in Figure 1.

Figure 3 is a perspective view of the decoy of Figure 1, but with its wings folded against its body portion, and Figure 4 is an elevational view of the upper portion of a support member for supporting the decoy and its wings in opened position.

In order to understand clearly the nature of the invention and the best means for carrying it out, reference may now be had to the drawings, in which like reference numerals denote similar parts throughout the several views.

As shown, there is a decoy main body portion 10 which is formed of sheet material such as oiled cardboard, pressed wood or veneer wood, the sheet being curved to simulate the contours of the body of a duck or goose, with rounded belly curve at 12 and back curve at 14, these two curves merging as shown to simulate the tail and tail feathers of the bird as at 16.

The forward portion of the sheet 10 is formed to simulate the neck 18 and head 20 of the bird, with its bill shown at 22. Reinforcing plates 24 and 26 are glued or otherwise fastened to each side of the forward portion of the sheet 10 and are shaped in the same manner. These plates may be of the same material as the main body portion 10, and extend only as far to the rearward as shown, also lending increased thickness to the neck and head portions, and need not extend downwardly below the edge line shown at 28.

Left and right wing portions 30 and 32 are hinged along their straight edge 34 to each side of the main body portion 10, by means of hinges 36, along a median line 38 extending longitudinally of the main body portion 10 from the chest curve 40 to the extreme tail feather end portion 42. The outer edge 44 of each wing portion is curved to simulate the body contours of the bird when seen from above, thus lending a sense of width thereto, when in their upraised or horizontal positions as shown in Figures 1 and 2.

Each wing portion is provided with a socket 46 secured to its underside, for the reception of an end portion 48 of one of the divergent arms 50 of a metallic wing support member 52 the arms of which are welded together at 54 and which has a downward extension or leg 56 which may be pressed into the ground for supporting the decoy. The leg 56 is provided with extension plates 58 near its lower end to firmly engage the ground and prevent accidental loosening or tilting from the vertical when in soft ground.

The lower curve 12 of the body 10 is notched out at 60 to receive the support member where the arms 50 meet. The arms 50 are resilient to permit them to be pressed toward each other to enter or be removed from the sockets 46, the wings flapping downward against the sides of the body portion 10 when the ends 48 are withdrawn from the sockets 46, forming a compact and relatively thin assembly which may be packed away when not in use. The wings are also made of the same material as the body 10. Although not illustrated, the decoy will be preferably painted or otherwise colored to simulate the appearance of the duck or goose, as is well known in the art.

Although we have described a preferred embodiment of our invention in specific terms, it is to be understood that various changes may be made in sizes, shape, materials and arrangement without departing from the spirit and scope of the invention as claimed.

We claim:

In a decoy for simulating birds, such as ducks, geese and the like, comprising a main body portion having a neck and a head portion thereon, and wings hinged at the opposite sides to the main body portion along a line longitudinally thereof, the features which include, a pair of sockets fixed upon the under sides of the wings, a locking notch formed in the lower portion of said main body portion, and a support having a downwardly extending, ground engaging, leg and two upwardly-extending arms secured together at a common junction at the lower portions and spaced apart at the upper portions thereof, said arms having upper end portions adapted to fit individually into the sockets upon the under sides of said wings in the raised position of said wings with the crotch or common junction at the lower portions of said arms fitting in the locking notch in the lower portion of said main body portion.

GEORGE C. WITHEY.
ROBERT E. WITHEY.

REFERENCES CITED

The following references are of record in the file of this patent:

UNITED STATES PATENTS

| Number | Name | Date |
|---|---|---|
| 274,124 | Keller | Mar. 20, 1883 |
| 311,877 | Danz | Feb. 10, 1885 |
| 1,083,882 | Hindmarsh | Jan. 6, 1914 |
| 1,227,129 | Frueh | May 22, 1917 |
| 1,473,612 | Dewey | Nov. 13, 1923 |